US008806930B2

(12) United States Patent
Chebli et al.

(10) Patent No.: US 8,806,930 B2
(45) Date of Patent: Aug. 19, 2014

(54) METHOD AND APPARATUS FOR DETERMINING THE DEPTH OF A METAL FEATURE IN A RUBBER OR ELASTOMERIC MATERIAL

(75) Inventors: Adib Chebli, Greer, SC (US); Metodi Ikonomov, Moore, SC (US)

(73) Assignees: Michelin Recherche et Technique S.A., Granges-Paccot (CH); Compagnie Generale des Etablissements Michelin, Clermont-Ferrand (FR)

( * ) Notice: Subject to any disclaimer, the term of this patent is extended or adjusted under 35 U.S.C. 154(b) by 111 days.

(21) Appl. No.: 13/389,830

(22) PCT Filed: Aug. 31, 2009

(86) PCT No.: PCT/US2009/055476
§ 371 (c)(1),
(2), (4) Date: Feb. 10, 2012

(87) PCT Pub. No.: WO2011/025497
PCT Pub. Date: Mar. 3, 2011

(65) Prior Publication Data
US 2012/0180560 A1    Jul. 19, 2012

(51) Int. Cl.
*G01M 17/02* (2006.01)
(52) U.S. Cl.
CPC ..................... *G01M 17/02* (2013.01)
USPC ......................................................... 73/146
(58) Field of Classification Search
USPC ................................................ 73/146–146.8
See application file for complete search history.

(56) References Cited

U.S. PATENT DOCUMENTS

| | | | |
|---|---|---|---|
| 3,857,095 A | 12/1974 | Mitchie et al. | |
| 5,121,110 A | 6/1992 | Mahar, Jr. et al. | |
| 5,241,280 A | 8/1993 | Aidun et al. | |
| 6,263,585 B1 | 7/2001 | Dickinson et al. | |
| 6,501,287 B1 | 12/2002 | Baldwin | |
| 6,907,777 B2 * | 6/2005 | Weiss | 73/146 |
| 7,185,534 B2 | 3/2007 | Stoila et al. | |
| 7,604,029 B2 * | 10/2009 | Myatt | 152/154.2 |
| 2002/0088527 A1 | 7/2002 | Tanaka et al. | |
| 2006/0137788 A1 * | 6/2006 | Myatt | 152/152.1 |
| 2007/0028679 A1 * | 2/2007 | Stoila et al. | 73/146 |
| 2007/0175555 A1 * | 8/2007 | Myatt | 152/152.1 |
| 2007/0251619 A1 * | 11/2007 | Bertrand | 152/152.1 |
| 2009/0320580 A1 * | 12/2009 | Mancosu et al. | 73/146 |
| 2012/0085159 A1 * | 4/2012 | Chebli et al. | 73/146 |

FOREIGN PATENT DOCUMENTS

| | | |
|---|---|---|
| JP | 63-169513 | 7/1988 |
| JP | 5-30717 | 4/1993 |
| JP | H02176515 A | 7/1993 |
| JP | H08304009 A | 11/1996 |
| JP | 2007212278 A | 8/2007 |

OTHER PUBLICATIONS

PCT International Search Report for PCT/US2009/55476, Dated Oct. 20, 2009.

* cited by examiner

*Primary Examiner* — Andre Allen
(74) *Attorney, Agent, or Firm* — Dority & Manning, P.A.

(57) ABSTRACT

A method and apparatus for determining the depth of a metal feature in a rubber or elastomeric material is provided. In certain embodiments, the present invention provides a method and apparatus for determining the depth of e.g., a metal cable in a tire. A sensor that changes state within range of the metal feature is used to determine the depth of such feature in the material without the necessity of deconstructing the material.

17 Claims, 2 Drawing Sheets

METHOD AND APPARATUS FOR DETERMINING THE DEPTH OF A METAL FEATURE IN A RUBBER OR ELASTOMERIC MATERIAL

FIELD OF THE INVENTION

The present invention relates to a method and apparatus for determining the depth of a metal feature in a rubber or elastomeric material such as e.g., a metal cable in a tire. The invention uses a sensor that changes state when placed within range of the metal feature to determine the depth of such feature in the material.

BACKGROUND OF THE INVENTION

Modern tire construction frequently includes metal components for providing strength and durability in certain portions of the tire. For example, bead cores on either side of the tire may include metal cords about which the carcass is wrapped. Belts with metal reinforcing members may be located below the tread region of the tire. The carcass, typically extending between sides of the tire, may also include metal reinforcements such as metal cables. In each case, these metal elements are usually encased with a rubber or elastomeric material and are located at some predetermined depth within the structure of the tire.

In certain tire inspection or repair operations, knowing the location of a metal element within the structure of the tire can be important. For example, to repair a tire that has been punctured or otherwise damaged, it may be necessary to remove a portion of the surface from the side of the tire so that a patch or other material can be applied in the repair. In the case of applying a patch to the inside surface of the tire, the removal of a certain depth of material from the inside surface of the tire may be needed. Such removal may be accomplished, for example, using a grinder applied to the surface of the tire. However, in general, damage to a metal component within the tire is to be avoided while removing the rubber material. While the location of e.g., a metal cable within the construction of a particular tire may be known in some instances, typically the precise location of a metal feature such as a cable within the tire is unknown, which complicates the process of removing material at or near the metal feature.

Accordingly, a device and method for determining the depth of a metal feature within a rubber or elastomeric material would be advantageous and useful. For example, a device and method that may be used to determine the depth of a metal feature such as e.g., a metal cable within a tire would also be advantageous and useful. Such a method and apparatus that can be used without calibration to a particular tire size or type would also be particularly useful. These and other advantages of the present invention will be apparent from the description that follows.

SUMMARY OF THE INVENTION

Objects and advantages of the invention will be set forth in part in the following description, or may be obvious from the description, or may be learned through practice of the invention.

In one exemplary aspect of the present invention, a method for determining the depth of a metal feature within a rubber or elastomeric material having opposing sides is provided. The method includes positioning a sensor at a starting position along one side of the material; moving the sensor relative to the material until the sensor changes state at a finishing position; determining the distance, along a direction normal to one side of the material, between the starting position and the finishing position where the sensor changed state; repeating said steps of positioning, moving, and determining along the other side of the material; determining the thickness of the material along the normal direction; and calculating the depth of the metal feature using measurements from the previously recited steps. This exemplary embodiment of the present invention may be used, for example, to determine the depth of a metal cable or other metal element within the construction of a tire.

Variations of this exemplary method of the present invention are also within the scope of the invention and claims that follow. For example, the starting position may be located at a surface of the material. In such case, the moving step would include withdrawing the sensor from the surface of the material or moving the sensor away from the surface of the material. The sensor may be configured to change state from on to off as the sensor is moved away from the surface of the material and the converse may also be used as well. The starting position of the sensor can be at a location where the metal feature is outside of the range of the sensor. The moving step may then include moving the sensor towards a surface of the material and, in such case, the sensor may be configured to change state from off to on as the sensor is moved towards the surface of the material.

The moving step may include moving the sensor along a direction normal to a surface on the one side of the material. However, the sensor may be moved along an angle with respect to the surface of the material. In such case, trigonometric functions can be used to calculate the depth of the material. In the event a sensor with variable sensitivity is utilized, the sensitivity may be adjusted such that the sensor responds to the metal feature when placed at the surface of the material and changes states at fixed range upon being withdrawn away from the metal feature. The sensor may be, for example, a proximity switch.

In another exemplary aspect of the present invention, an apparatus for determining the depth of a metal feature within a rubber or elastomeric material having opposing sides is provided. The apparatus includes a sensor that activates upon coming within range of a metal or metallic substance. A housing is configured for receipt of the sensor. A positioning element is provided for locating the sensor relative to a surface of the rubber or elastomeric material. The apparatus includes means for measuring the distance between sensor and the surface of the rubber or elastomeric material. The apparatus also includes means for measuring the thickness of the rubber or elastomeric material.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
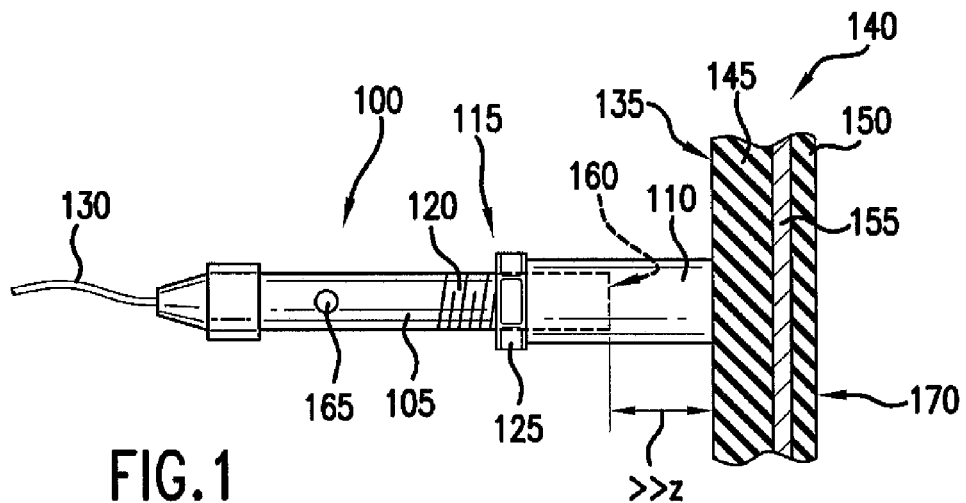
FIG. 1 illustrates a side view of an exemplary embodiment of the present invention in which a sensor placed on the surface of a material containing a metal feature. The material is shown in cross-section and the thickness of the metal feature is slightly exaggerated for purposes of clarity in describing the present invention.

The present invention relates to method and apparatus for determining the depth of a metal feature within a rubber or elastomeric material. For example, the present invention may be used to determine the location of a metal cable within the construction of a tire. For purposes of describing the invention, reference now will be made in detail to embodiments and methods of the invention, one or more examples of which are illustrated in the drawings. Each example is provided by way of explanation of the invention, not limitation of the invention. In fact, it will be apparent to those skilled in the art that various modifications and variations can be made to the present invention without departing from the scope or spirit of the invention. For instance, features illustrated or described as part of one embodiment, can be used with another embodiment to yield a still further embodiment. Thus, it is intended that the present invention covers such modifications and variations as come within the scope of the appended claims and their equivalents.

FIG. 1 provides a perspective view of an exemplary embodiment of a depth measurement apparatus 100 as may be used with the present invention. More specifically, depth measuring apparatus 100 is constructed from a sensor 105 that is activated upon being placed within a certain range of metal. By way of example, a Contrinex™ DW-AS-523-M12 proximity switch provided by Contrinex™ of Old Saybrook, Conn. may be used with the present invention. As will be understood by one of ordinary skill in the art using the teachings disclosed herein, other proximity switches or sensors may be used with the present invention as well, provided such sensors are activated, or change state, upon being placed into—or taken out of—range of a targeted metal feature.

Sensor 105 is received within a housing 110 and is configured for movement in and out of housing 110. For the embodiment of FIG. 1, housing 110 is constructed from a plastic tube or pipe so as not to provide a false indication to sensor 105. Sensor 105 is connected to housing 110 by a positioning element 115 that includes, for this exemplary embodiment, a series of threads 120 and nut 125. Nut 125 is connected to housing 110 and freely rotates relative to housing 110. Cord 130 provides power to sensor 105 and can also be used for the transfer of information such as e.g., activation or a change in state of sensor 105.

Figure 2:
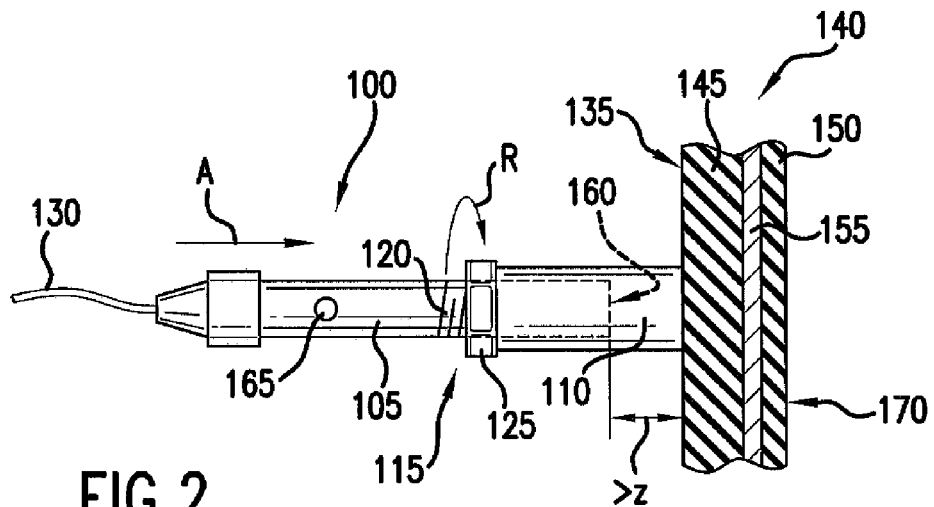
FIG. 2 illustrates another side view of the sensor in FIG. 1 and depicts movement of the sensor towards the surface of the material.

Turning now to FIG. 2, as nut 125 is rotated (indicated by arrow R), sensor 105 will be drawn into the housing 110—i.e., move in the direction of arrow A—as nut 125 acts upon threads 120. Conversely, by turning nut 125 in an opposite direction, sensor 105 will be moved out of the housing 110. Accordingly, the position of sensor 105 may be determined as desired by rotation of nut 125. Positioning element 115 is provided by way of example only. Other constructions may be used for movement and positioning of sensor 105 as will be understood by one of ordinary skill in the art using the teachings disclosed herein. By way of example, sensor 105 could include a boss or other feature that fits into a recess or guide along housing 110.

As shown in each of the figures, housing 110 is placed against a surface 135 along one side of the wall 140 of a tire. For purposes of describing the invention, wall 140 is illustrated as being constructed of a rubber layer 145 along one side and another rubber layer 150 along the other side of wall 140. Located between rubber layers 145 and 150 is a metal feature such as metal cable 155, the thickness of which has been exaggerated for purposes of clarity in describing the present invention. As previously discussed, the present invention may be used with other objects as well and is not limited to use with tires. For example, the present invention may be used to determine the depth of a metal feature in other rubber or elastomeric objects including, for example, belts, hoses, and others.

For purposes of performing e.g., repairs on tire wall 140, it is desirable to know the depth at which metal cable 155 is located within wall 140. For example, it may be necessary to remove a portion of layer 145 or 150 to perform a tire repair. Accordingly, to assist in avoiding to damage cable 155, the position of cable 155 within wall 140 is desired. An exemplary method of using measuring apparatus 100 to determine the depth of cable 155 will now be described.

Returning again to FIG. 1, sensor 105 is shown here at a location outside the operating range. More specifically, in FIG. 1, the end 160 of sensor 105 is not close enough to wall 140 to detect metal cable 155. Assume, for purposes of discussion, measurement z represents the distance from the surface 135 at which sensor 105 will activate due to the presence of metal cable 155. Then, as illustrated by ">>z" and the lead line to sensor end 160, sensor 105 is outside the range at which it will be activated by the present of metal cable 155.

Turning now to FIG. 2, nut 125 is rotated (arrow R) as previously described in order to move sensor 105 into housing 110 (arrow A) and, therefore, move end 160 closer to the metal cable 155. As shown in FIG. 2 and illustrated by ">z" and the lead line to end 160, sensor 105 is still not close enough to detect the present of metal cable 155. Accordingly, rotation in the direction of arrow R of nut 125 continues.

Figure 3:
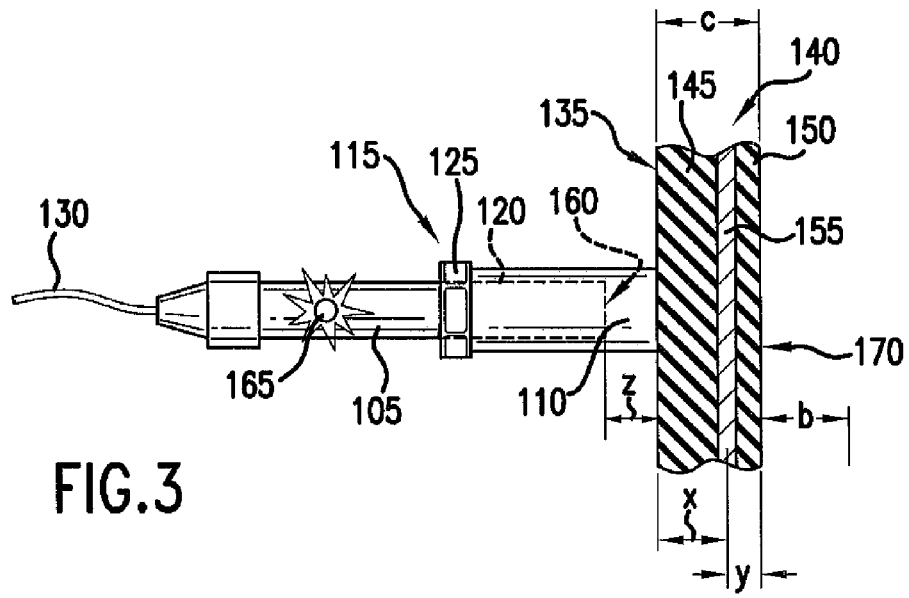
FIG. 3 illustrates another side view of the sensor in FIG. 1 and depicts a change of state in the sensor or activation of the sensor upon being moved into range of the metal features within the material.

As shown in FIG. 3, end 160 of sensor 105 has moved to a position where metal cable 155 is now detected. At this position, sensor 105 changes state—or activates—due to the presence of metal cable 155 within range. For the exemplary embodiment of FIG. 3, a signal device such as LED 165 flashes or turns on as shown in FIG. 3 in order to indicate the activation of sensor 105 and the placement of end 160 within range of metal cable 155. Alternatively, LED 165 could be configured to stop flashing or turn off upon the placement of end 160 within range of metal cable 155. In either case, sensor 105 changes state—either by activating or deactivating, turning on or turning off, etc.—in order to indicate that metal cable 155 has come into sensing range. Upon such an event signaling the detection of metal cable 155, the rotation of nut 125, and therefore the movement of sensor 105, is terminated. The distance z from end 160 of sensor 105 is then measured and recorded. By way of example, distance z could be measured manually using a ruler. Alternatively, measurement indicia could be provided on the surface of housing 110 and/or sensor 105. By way of further example, measuring apparatus 100 could be provided with an electronic device for automatically determining distance z based on the position of sensor 105 within housing 110.

Next, these same or similar steps are repeated for the other side of tire wall 140. More specifically, nut 125 is rotated to withdraw sensor 105 from housing 110 until end 160 is at a distance outside the range of metal cable 155. Housing 110 is then placed against rubber layer 150 along the other side of tire wall 140. Sensor 105 is moved into housing 110 and towards surface 170 to determine the location at which end 160 moves into range of metal cable 155. As shown in FIG. 3, measurement b represents the distance between surface 170 and the end 160 of sensor 105 at the point where metal cable 155 comes into the range of sensor 105 causing it to activate or change state.

Referring now to FIG. 3, measurement c represents the overall thickness of wall 140 at the location where housing 110 was positioned to determine measurements z and b. Measurement c may be determined, for example, by using calipers applied at, or close to, the location where measurements z and b are taken. Other devices may also be used to measure the overall thickness of wall 140 as well.

Using measurements z, b, and c, the depth of metal cable 155 can be determined as follows. As shown in FIG. 3, x represents the yet unknown distance between the surface 135 and the center of cable 155, and y represents the also yet unknown distance between surface 170 and the center of cable 155. Accordingly, knowing that the sum of x and y is equal to measurement c (the overall thickness of wall 140, x and y can be calculated. For example, x may be calculated using the following equation:

$$x=(b-z+c)/2 \quad (1)$$

where:
x is the distance from surface 135 to the center of metal cable 155
b is the measured distance from surface 170 to the end 160 of sensor 105
z is the measured distance from surface 135 to the end 160 of sensor 105
c is the thickness of wall 140 at the point of measurements b and z Equation (1) is based upon the assumption that distances b and z are determined from the center of metal cable 155 and are unaffected by any curvature of surfaces 135 and 170 or the presence of non-metallic substances.

Figure 4:
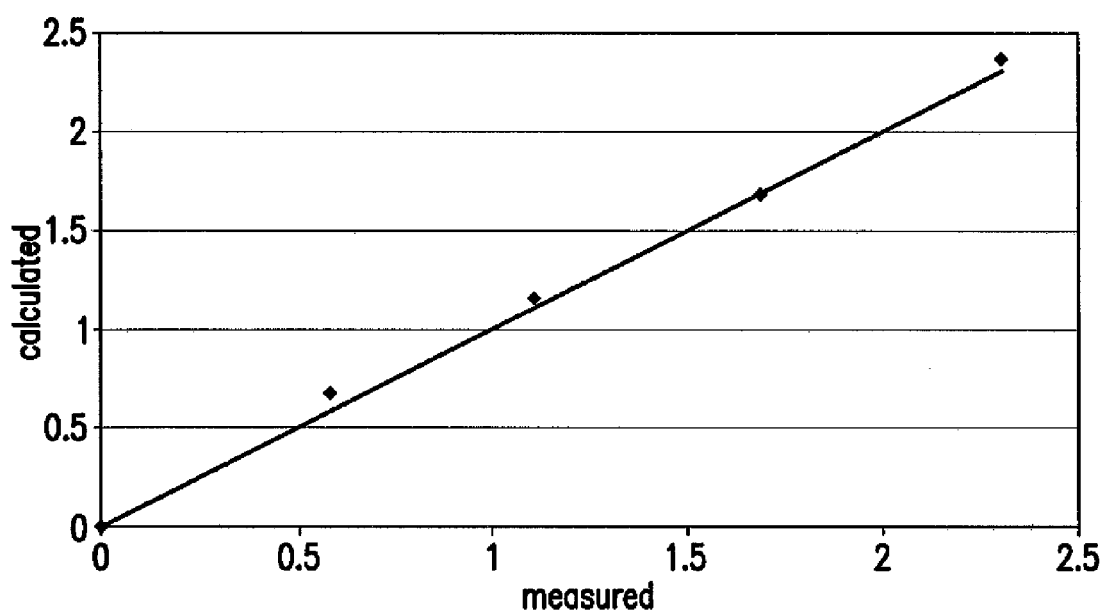
FIG. 4 provides a plot of certain experimental data as will be described below.

Using a proximity switch for sensor 105 as previously identified, a series of experiments were conducted in which the depth of a metal cable in a rubber sample were determined based on the method described above and were also determined by direct physical measurement. FIG. 4 provides a plot of the resulting data where the abscissa represents the direct physical measurement of the cable depth and the ordinate represents the depth as determined using the present invention. As illustrated by FIG. 4, the present invention provides an accurate and reliable method of determining the depth of a metal object in a rubber or elastomeric material without the necessity of deconstructing such material or calibrating the instrument based on e.g., different tire types.

Using the teachings disclosed herein, one of ordinary skill in the art will understand that other methods may be used within the scope of the present invention as well. For example, the exemplary method described above relied upon activation of the sensor 105 by moving sensor 105 towards wall 140 from a position out of the range of detection to a position at the point of detection of metal cable 155. However, sensor 105 could also be used to determine distances b and z by first placing sensor 105 into the range of detection of metal cable 155 and then moving sensor 105 away from wall 140 to the point where sensor 105 no longer detects metal cable 155. Combinations of moving sensor 105 towards or away from wall 140 may also be used with the scope of the present invention. In each case, the activation or deactivation of sensor 105 based on a consistent range of detection for metal such as metal cable 155 allows for the determination of the depth of cable 155 as described above.

The present invention has been described based on moving the sensor 105 along a path normal to wall 140 or surfaces 135 and 170. Using the teachings disclosed herein, however, it will be understood that other angles for the movement of sensor 105 may be used as well—particularly for objects having a metal layer that is straight or substantially straight for a given range of movement of sensor 105. For example, for a relatively straight or flat metal cable 155, sensor 105 could be moved at an acute angle with respect to surfaces 135 and 170. In such case, distances z and b can be calculated using trigonometric functions.

Finally, the exemplary embodiment above was described using a single sensor 105. However, in another exemplary embodiment of the present invention, two sensors could be used along opposing sides of the material in order to e.g., eliminate a step of moving a single sensor from one side of the material to the other as previously described. Where two sensors are used, the sensors should be matched so that they are identical in their response to distance, material, and geometry—including any non-linearity in their response. Additionally, one sensor may be turned off while applying the other sensor so as not to affect the measurement.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A method for determining the depth of a metal feature within a rubber or elastomeric material having opposing sides, the method comprising;
    positioning a sensor at a starting position along one side of the material;
    moving the sensor relative to the material until the sensor changes state at a finishing position;
    determining the distance, along a direction normal to one side of the material, between the starting position and the finishing position where the sensor changed state;
    repeating said steps of positioning, moving, and determining along the other side of the material;
    determining the thickness of the material along the normal direction; and
    calculating the depth of the metal feature using measurements from the previously recited steps.

2. A method for determining the depth of a metal feature within a rubber or elastomeric material having opposing sides as in claim 1, wherein said starting position is located at a surface of the material.

3. A method for determining the depth of a metal feature within a rubber or elastomeric material having opposing sides as in claim 2, wherein said moving step comprises withdrawing the sensor from the surface of the material.

4. A method for determining the depth of a metal feature within a rubber or elastomeric material having opposing sides as in claim 3, wherein the sensor changes state from on to off as the sensor is moved away from the surface of the material.

5. A method for determining the depth of a metal feature within a rubber or elastomeric material having opposing sides as in claim 1, wherein the starting position is at a location where the metal feature is outside of the range of the sensor.

6. A method for determining the depth of a metal feature within a rubber or elastomeric material having opposing sides as in claim 5, wherein said moving step comprises moving the sensor towards a surface of the material.

7. A method for determining the depth of a metal feature within a rubber or elastomeric material having opposing sides as in claim 6, wherein the sensor changes state from off to on as the sensor is moved towards the surface of the material.

8. A method for determining the depth of a metal feature within a rubber or elastomeric material having opposing sides as in claim 1, wherein said moving step further comprises moving the sensor along a direction normal to a surface on the one side of the material.

9. A method for determining the depth of a metal feature within a rubber or elastomeric material having opposing sides as in claim 1, further comprising the step of adjusting the sensitivity of the sensor such that the sensor responds to the metal feature when placed at the surface of the material and changes states upon being withdrawn away from the metal feature to a distance such that the metal feature is outside of the range of the sensor.

10. A method for determining the depth of a metal feature within a rubber or elastomeric material having opposing sides as in claim 1, wherein the metal feature is a metallic cord or cable located within a tire.

11. A method for determining the depth of a metal feature within a rubber or elastomeric material having opposing sides as in claim 1, wherein the sensor is a proximity switch.

12. An apparatus for determining the depth of a metal feature within a rubber or elastomeric material having opposing sides, comprising:

a sensor that activates upon coming within range of a metal or metallic substance;

a housing configured for receipt of the sensor, a positioning element for locating the sensor relative to a surface of the rubber or elastomeric material;

means for measuring the distance between sensor and the surface of the rubber or elastomeric material; and means for measuring the thickness of the rubber or elastomeric material.

13. An apparatus for determining the depth of a metal feature within a rubber or elastomeric material having opposing sides as in claim 12, wherein said positioning element is a nut attached to the housing and connected by threads to the sensor.

14. An apparatus for determining the depth of a metal feature within a rubber or elastomeric material having opposing sides as in claim 12, wherein said means for measuring the thickness of the rubber material comprises a pair of calipers.

15. An apparatus for determining the depth of a metal feature within a rubber or elastomeric material having opposing sides as in claim 12, further comprising a signal light for indicating when the sensor has detected the present of the metal feature.

16. An apparatus for determining the depth of a metal feature within a rubber or elastomeric material having opposing sides as in claim 12, wherein said sensor comprises a proximity switch.

17. An apparatus for determining the depth of a metal feature within a rubber or elastomeric material having opposing sides as in claim 16, wherein the metal feature comprises a metal or metallic element within a tire.

\* \* \* \* \*